United States Patent

[11] 3,617,904

[72] Inventor  Francis C. Marino
        Huntington, N.Y.
[21] Appl. No. 830,838
[22] Filed    June 5, 1969
[45] Patented Nov. 2, 1971
[73] Assignee  Digitronics Corporation
        Albertson, N.Y.

[54] NOISE INSENSITIVE PEAK DETECTOR
    5 Claims, 8 Drawing Figs.
[52] U.S. Cl. ...................................... 328/117,
        307/234, 307/235, 328/111, 328/150
[51] Int. Cl. ...................................... H03k 5/20
[50] Field of Search ........................... 307/233–5;
        328/109–112, 114–7, 150, 163, 165, 167

[56]            References Cited
            UNITED STATES PATENTS
3,277,311  10/1966  Merlen et al. ................. 328/111 X
3,437,833  4/1969   Razaitis et al. ................ 328/110 X

*Primary Examiner*—Donald D. Forrer
*Assistant Examiner*—John Zazworsky
*Attorney*—Yuter & Fields ABSTRACT: A noise insensitive peak detector which includes a first signal path and a second signal path both of which are - adapted to be connected to a signal source wherein the source signal may comprise noise signals in addition to information signals. The first path includes a peak detector which produces a pulse in response to the peaks in the source signal. The second signal path includes a first pulse-producing means for producing first pulses in response to the portions of the source signal having substantially zero slope and second pulse-producing means for producing second pulses in response to said first pulses having a width greater than a preselected width. Coincidence means is provided which is connected to the first and second paths and is responsive to the coincidence of the output of the peak detector and the second pulses for producing an output pulse.

The invention also includes the novel noise rejection system in said second path.

PATENTED NOV 2 1971 3,617,904
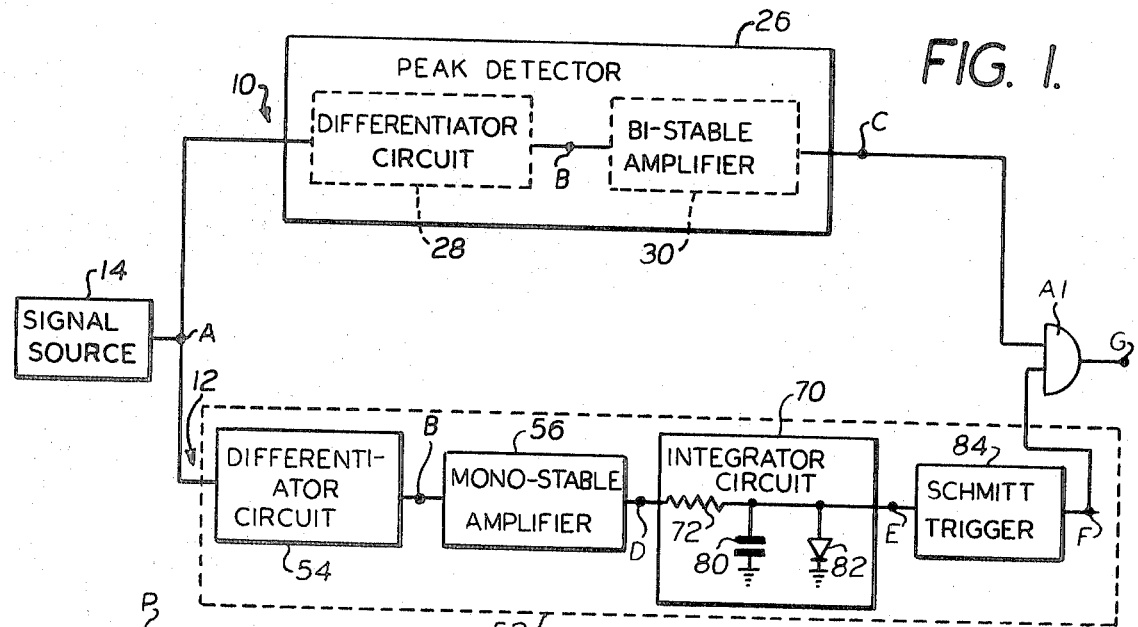
FIG. 1.
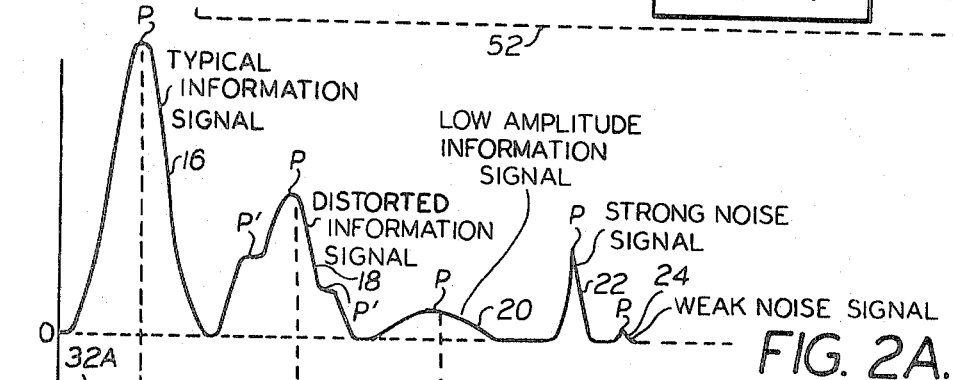
FIG. 2A.
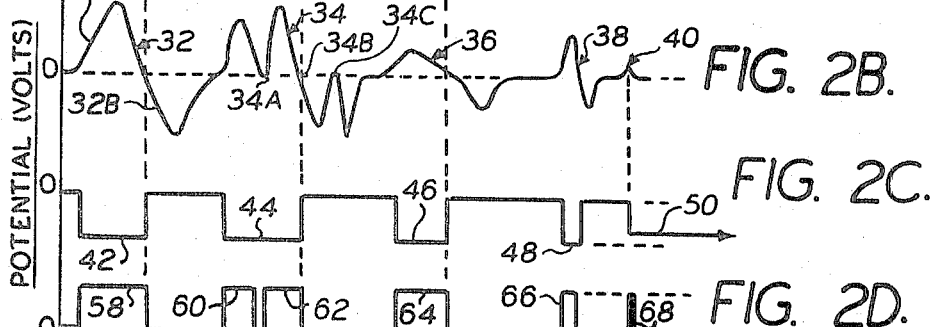
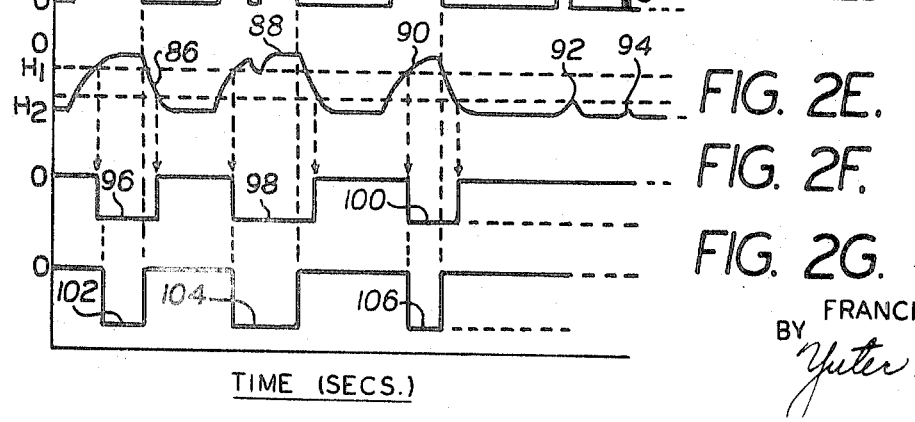
TIME (SECS.)
INVENTOR
FRANCIS C. MARINO
BY
Yuter & Spicens
ATTORNEYS.

3,617,904

NOISE INSENSITIVE PEAK DETECTOR

This invention relates generally to a peak detection system and, more particularly, pertains to a noise insensitive peak detection system employing novel noise rejection means.

Magnetic tape systems of the type utilized in conjunction with data-communication systems are susceptible to a loss of amplitude of the recorded information signal during playback or a read operation due to such factors as loose oxide, foreign matter on the tape, etc. Additionally, pulse crowding on the record medium has an effect on the shape of the playback signal and high pulse densities have resulted in distorted waveforms. The effects of such loss of amplitude and waveform distortion are particularly important considerations in an NRZI (nonreturn-to-zero) data-communication system wherein the binary one's are represented by bipolar signals.

In practice, it has been found that the peak of the playback signals are least effected by loss of amplitude and pulse crowding. According, in such NRZI systems, the playback signal is applied to a full-wave rectifier, the output signal of which is, in turn, applied to a peak detector which develops digital output transitions corresponding, in time, to the peaks of the rectified signals.

Such peak detectors of the type under consideration are usually sensitive to high-frequency signals die to the fact that the peak detectors include differentiator circuits. As a result, noise signals cause such peak detectors to produce erroneous output signals which obviously cannot be tolerated in data communication systems. In practice, such noise signals are prevented from affecting the peak detector by making the peak detector sensitive to potential level above a preselected threshold level, it being understood that the majority of noise signals fall below such threshold level. However, such peak-detector systems are unreliable due to the fact that the low-amplitude information signals noted above fail to operate the peak detector and erroneous results are again produced.

Accordingly, an object of this invention is to provide an improved peak-detector system.

A more specific object of this invention is to provide a peak-detector system which is insensitive to noise signals.

Another object of the present invention resides in the novel details of circuitry which provide a peak-detection system of the type described which is reliable and efficient in operation.

Accordingly, a noise-insensitive peak-detection system constructed according to the present invention comprises a first signal path and a second signal path adapted to be connected to a signal source wherein the source signal may comprise noise signals in addition to information signals. Peak detection means is provided in said first path for producing respective pulses in response to the occurrence of peaks in the source signal. Noise rejection means is provided in the second path for producing pulses in response to the occurrence of information signals only in the source signal. The noise rejection means includes a first pulse-producing means for producing first pulses in response to the portions of the source signal having substantially zero slope and second pulse-producing means for producing second pulses in response to said first pulses having a width greater than a preselected width. Coincidence means is connected to the first and second paths and is responsive to the coincidence of said peak detection means pulses and the second pulses for producing output pulses.

A feature of the present invention is the provision of a novel noise-rejection system for rejecting noise signals.

Other features and advantages of the present invention will become more apparent from a consideration of the following detailed description when taken in conjunction with the accompanying drawings, in which:

FIG. 1 is a schematic block diagram of a noise-detection system employing a novel noise-rejection system constructed according to the present invention; and FIGS. 2A–2G illustrate waveforms appearing at different points in the circuit of FIG. 1.

Accordingly, FIG. 1 shows that the noise-detection system of the present invention includes a first signal path 10 and a second signal path 12. The inputs to the signal paths 10 and 12 are connected together at the point A and to a signal source 14. In the present illustrative embodiment it is assumed that the signal source 14 comprises a magnetic tape source having a conventional read head for transducing the signals on the magnetic tape into corresponding waveforms. The source signal includes information signals and may include noise signals due to imperfections on the magnetic tape such as loose oxide and foreign matter. Additionally, the signal source may include distorted waveforms due to pulse crowding and the like. Thus, the signal appearing at the point A in the circuit of FIG. 1 may be represented by the waveform of FIG. 2A.

More specifically, the wave form of FIG. 2A includes a typical information signal 16 having a peak P. This is followed by a distorted information signal 18 having a peak P and false peaks P' located to the left and right of the peak P. The distorted information signal 18 is followed by an information signal 20 of low amplitude so that the peak P of the signal 20 is substantially below the peak P of the signal 16. The signal 20 is followed by a relatively strong noise signal 22 having a peak P which, in turn, is followed by a relatively weak noise signal having a peak P. It is to be noted that the noise signals 22 and 24 have a width which is substantially smaller than the width of the information signals 16–20. AS noted above, the source signal of FIG. 2A is applied to paths 10 and 12.

Connected in the path 10 is a peak detector 26. In particular, the peak detector 26 may comprise the peak detector shown and described in copending application, Ser. No. 406,495 filed Oct. 26, 1964, and titled Signal Detection Apparatus. The peak detector of the aforementioned application is substantially a peak detector which is responsive to a polarity transition of the derivative of the input signal to produce output pulses only in response to the occurrence of the peaks of the input signal. Only those portions of the peak detector of the aforementioned application which are necessary for an understanding of the present invention are described herein. If one desires more information on the aforementioned peak detector, the reader is referred to the subject application. Accordingly, he peak detector 26 includes a differentiator circuit 28 and a serially connected bistable amplifier 30. The waveform appearing at the point B between the differentiator circuit 28 and the bistable amplifier 30 is illustrated in FIG. 2B and is the differentiated source signal showing in FIG. 2A.

More particularly, the differentiator 28 produces a signal which varies about the zero-reference level. The operation of the differentiator circuit 28 is conventional and produces a zero-level signal in response to points of zero slope in the input signal. Thus, as shown in FIG. 2B, the signal 32, which represents the differential of the signal 16, includes a first portion 32A corresponding to the rise of the signal 16 from zero to the level P. The peak P of the signal 16 is a point of zero slope so that the signal 32 reaches the zero level at that point. Since the second half of the signal 16 decreases from the peak P to zero the second half 32B of the signal 32 passes through zero-reference level, produces a minimum peak and then increases to zero.

The signal 34 represents the differential of the signal 18. Thus, since the point P' to the right of the peak P of the signal 18 is a point of zero slope, the differentiated signal produces a zero level at this point, as designated by the reference character 34A. However, since the signal 18 increases between the point P' to the left of the peak P to the peak P, the signal 34 does not pass through zero but continues to rise again from the point 34A. The signal 34 passes through the zero reference at the location designated by the reference character 34B corresponding to the true peak P of the information signal 18. At the the point P' the false peak P' to the right of the peak P of the signal 18, the signal 34 reaches the zero level at the point 34C and then decreases again to a minimum amplitude whereupon it rises again to the zero level. Similar comments apply for the signals 20, 22 and 24 which produce waveforms 36, 38 and 40, respectively, of the differentiated signal of FIG. 2B.

The differentiated signal appearing at the point B is applied to the bistable amplifier 30. As used herein, it is to be understood that it has two steady states of operation wherein the amplifier will switch from a first state to a second state when the input signal rises above a preselected level. However, when the input signal returns to the zero level, the bistable amplifier 30 will remain in the second state. It does not switch back to the first state until the input signal has decreased below the zero-reference level. This is to be contradistinguished from a monostable amplifier which, as used in this disclosure, is defined as an amplifier which will switch from a first to a second state in response to the input signal rising above a preselected value but which will switch back to the first state when the input signal has decreased to the zero level. Summarizing, the bistable amplifier will switch from the first to the second state in response to the input signal but will not switch back to the first state albeit the input signal is removed. The bistable amplifier, however, will switch back to the first state if the input signal decreases below the zero reference level. On the other hand, the monostable amplifier will switch from the first to the second state in response to the input level rising above a preselected value but will switch back to the first state if the input signal is removed.

The bistable amplifier 30 is connected to one input terminal of an AND-gate A1. The waveform appearing at the point C, which is the output of the bistable amplifier 30, is illustrated in FIG. 2C. More particularly, as the waveform 32 rises above the triggering level for the bistable amplifier 30, the amplifier will switch states as shown by the leading edge of the pulse 42. when the waveform 32 passes through the zero reference the bistable amplifier 30 switches back to the first state thereby terminating the pulse 42.

As the waveform 34 rises above the triggering level of the amplifier 30, the amplifier 30 produces the leading edge of the pulse 44. Since the waveform 34 does not pass through the zero reference at the point 34A but simply reaches the zero reference and then begins to increase in amplitude the bistable amplifier will remain in its switched state. HOwever, at the point 34B the waveform 34 passes through the zero reference thereby causing the bistable amplifier 30 to switch back to the first state and terminate the pulse 44. Similarly to the point 34A, the point 34C of the signal 34 does not pass through the zero reference so that the amplifier 30 does not switch at this point. The signal or waveform 36 and 38 cause the amplifier 30 to produce the pulses 46 and 48, respectively, in a manner similar to the waveform or signal 32.

For purposes of illustration, it is assumed that the noise pulse 24 which produces the differentiated signal 40 has an amplitude sufficient to cause the amplifier 30 to switch from the first to the second state but is insufficient to cause the amplifier to switch back to its first state. Thus, the amplifier will remain in the second state until the next occurring signal which is sufficient to trigger the amplifier back to the first state. Thus, the signal 40 produces the leading edge of a pulse 50, the trailing edge of which (not shown) is produced by the next occurring strong pulse. The waveform of FIG. 2C is applied to one input terminal of the AND-gate A1.

Connected in the second path 12 is a noise-rejection system designated generally by the reference numeral 52. The noise-rejection system 52 comprises a differentiator circuit 54 similar in construction to the differentiator circuit 28. Thus, the differentiated waveform appearing at the output of the differentiator circuit 54 will be similar to the waveform of FIG. 2B which appears at the output of the differentiator circuit 28. Thus, the output of the differentiator 34 is likewise designated by the reference character B.

The differentiator circuit 54 is connected to a monostable amplifier 56. As noted above, the monostable amplifier is operable to switch from a first to a second state in response to the input signal rising above a preselected level but will switch back to the first state when the input signal decreases to the zero level or when the input signal is removed. Accordingly, the waveform appearing at the output of the monostable amplifier 56, which is designated generally by the reference character D, is illustrated in FIG. 2D. Thus, as the portion 32A of the signal 32 increases above the triggering level for the monostable amplifier 56 which is of conventional construction and commercially available, the monostable amplifier will switch from the first to the second state to produce the leading edge of the pulse 58. As the signal 32 decreases to the zero level, the amplifier 56 switches back to the first state thereby terminating the pulse 58. As the next occurring pulse 34 begins to rise in amplitude the amplifier 56 is again triggered to produce the leading edge of the pulse 60. However, as the signal 34 decreases to the zero-reference level at point 34A, the amplifier 56 switches back to the first state thereby terminating the pulse 60. As the signal 34 rises again from the point 34A the monostable amplifier 56 is again triggered to switch to the second state thereby initiating the pulse 62. As the pulse 34 again decreases to the zero level the amplifier 56 terminates the pulse 62. It is to be noted that the amplifier 56 is insensitive to signals below the zero reference and therefore does not switch states in response thereto. The signals 36 and 38 cause the amplifier 56 to produce respective pulses 64 and 66 in a similar manner. However, the signal 40, which is of relatively low amplitude, will not trigger the monostable amplifier to cause it to switch from the first to the second state or, in the worst case, will cause an erratic and oscillatory response of the amplifier, as indicated by the reference numeral 68 in FIG. 2D. The waveform of FIG. 2D is applied to an integrator circuit 70 which is connected to the output of the monostable amplifier 56.

The integrator circuit 70 includes a serially connected resistor 72 and a shunt capacitor 80 which is connected between the output end of the resistor 72 and ground. Connected in parallel with the capacitor 80 is a diode 82. The anode electrode of the diode 82 is connected to the output end of the resistor 72 and the cathode electrode of the diode 82 is connected to ground. The output of the integrator circuit 70 is connected to the input of a wave-shaping circuit which, in the embodiment under consideration, comprises a Schmitt trigger 84. The diode 82 serves as a clamp to clamp the output of the resistor-capacitor combination to ground to protect the Schmitt trigger from high potentials which may damage the same. It is obvious that if a different type of circuit is utilized, the diode 82 may be eliminated. The output of the integrator circuit 70 is designated generally by the reference character E and the waveform appearing at the point E is illustrated in FIG. 2E.

The integrator circuit 70 integrates the signal applied to its input i.e., in the present embodiment, the integrator 70 integrates the waveform of FIG. 2D. Thus, as the pulse 58 is applied to the integrator circuit 70, the output at the point E begins to rise until it reaches zero voltage at which the output is clamped. When the pulse 58 terminates the output of the integrator circuit begins to decrease thereby to form the signal 86. When the input signal 60 is applied to the integrator 70, the output again rises to approximately 0 volts. Similarly when the pulse 60 terminates the output begins to decrease. However, since the pulse 62 occurs a relatively short time interval after the pulse 60, the output of the integrator circuit 70 drops a relatively few volts before the output again increases to 0 volts. When the pulse 62 terminates, the output of the integrator circuit 70 again decreases to the reference level. Hence, the pulses 60 and 62 will produce the signal 88 at the output of the integrator circuit. Similarly to the pulse 58, the pulse 64 will cause the integrator circuit 70 to produce the signal 90.

The pulse 66, which is of relatively small width as compared to the pulses 58–64, will cause the integrator circuit 70 to produce the pulse 92 of relatively small amplitude. Similarly, the oscillatory response 68 will cause the integrator circuit 70 to produce the even smaller ampliture signal 94.

The triggering levels of the Schmitt trigger 84 are indicated on the waveform of FIG. 2E. Accordingly, the dotted line H1 represents the potential at which the Schmitt trigger 84 will switch states (i.e., that is, the level at which the Schmitt trigger will switch from the first state to the second state). The dotted line H2 indicates the level at which the Schmitt trigger 84 will switch back to its original state (i.e., from its second state to its first state). The output of the Schmitt trigger is connected to the other input terminal of the AND-gate A1. Additionally, the output of the Schmitt trigger 84 is designated generally by the reference character F. The waveform appearing at the point F as a result of the waveform of FIG. 2E being applied to the input of the Schmitt trigger is illustrated in FIG. 2F.

As the signal 86 increases in amplitude and reaches the level H1, the Schmitt trigger changes from the first to the second state thereby to produce the leading edge of a pulse 96. As the signal 86 decreases in amplitude to the level H2, the Schmitt trigger switches back to its first state to terminate the pulse 96. Similarly, as the signal 88 rises to the level H1 the Schmitt trigger again switches from the first to the second state to initiate a pulse 98. As noted above, the signal 88 decreases slightly and then increases again to 0 volts. However, during this initial decline the signal 88 does not reach the level H2 so that the Schmitt trigger remains in the second state. Thereafter, the signal 88 decreases below the level H2 at which time the Schmitt trigger switches back to the first state thereby terminating the pulse 98. The signal 90 causes the Schmitt trigger 84 to produce a pulse 100 in a manner similar to the production of the pulse 96.

It is to be noted that the signal 92 does not reach the triggering level H1 of the Schmitt trigger 84. Thus, the Schmitt trigger 84 does not produce any pulses in response to the signals 92 and 94.

It will be obvious from the waveform of FIG. 2F that the noise-rejection system 52 substantially rejects any pulses produced by noise signals. That is, the pulses 96-100 represent pulses which are caused by information signals only, whether they be of the required or low amplitude.

The AND-gate A1 is conventional in operation and produces an output pulse at the point G when both inputs are enabled. That is, in the circuit under consideration, when a negative signal is applied to both inputs of the AND-gate, a negative will appear at the output.

More particularly, the signal appearing at the point G is shown in FIG. 2G. When the pulse 42 of FIG. 2C is applied to one input of the AND-gate A1, the other input is still at a zero level. HOwever, upon the occurrence of the leading edge of the pulse 96, both inputs to the AND-gate will be enabled to produce the leading edge of a pulse 102. The trailing edge of the pulse 42 of FIG. 2C occurs first in time with respect to the trailing edge of the pulse 96 of FIG. 2F. Accordingly, upon the occurrence of the trailing edge of the pulse 42, the pulse 102 will terminate. Similar comments apply for the pulses 104 and 106 of the waveform of FIG. 2G. It will be noted that the final output waveform at G does not contain any transitions which may be caused by either false peaks occurring in the input signal or noise signals.

Accordingly, there has been disclosed a peak-detection system employing a novel noise-rejection system which is highly reliable in operation.

While a preferred embodiment of the invention has been shown and described herein it will become obvious that numerous omissions, changes and additions may be made in such embodiment without departing from the spirit and scope of the present invention.

What is claimed is:

1. A noise-insensitive peak-detection system comprising a first signal path and a second signal path adapted to be connected to a signal source wherein the source signal may comprise noise signals in addition to information signals; peak detection means in said first path for producing respective pulses in response to the occurrence of peaks in the source signal; noise rejection means in said second path for producing pulses in response to the occurrence of information signals only in the source signal; said noise rejection means comprising first pulse-producing means for producing first pulses in response to the portions of said source signal having substantially zero slope, and second pulse-producing means for producing second pulses in response to said first pulses having a width greater than a preselected width; and coincidence means connected to said first and second paths and responsive to the coincidence of said peak detection means pulses and said second pulses for producing output pulses, said second pulse-producing means including an integrator circuit for producing signals representing the integration of said first pulses, and wave-shaping means connected to said integrator circuit for producing said second pulses in response to changes of said integrator signal from a first level to a second level.

2. A noise-insensitive peak-detection system as in claim 1, in which said first pulse-producing means comprises a differentiating network for producing the differential of the source signal, and a monostable amplifier connected to said differentiating network, said monostable amplifier being operable to change its state of conduction from a first state to a second state in response to a change of said differentiated signal from a reference level to a first level and to revert back to its first state when said differentiated signal reverts back to its reference level.

3. A noise-insensitive peak-detection system as in claim 1, in which said peak detection means comprises network means for producing a network signal which varies about a reference level wherein the portions of said network signal at said reference level correspond to portions of zero slope of the source signal, and a bistable amplifier connected to said network means and being operable to initiate a peak detection means pulse when said network means signal rises above said reference level and to terminate said pulse when said peak detection means signal falls below said reference level.

4. A noise-insensitive peak-detection system as in claim 3, in which said network means comprises a differentiator circuit, and said reference level corresponds to a 0 voltage level.

5. A noise-rejection system adapted to be connected to a signal source wherein the source signal may comprise noise signals in addition to information signals comprising: first pulse-producing means for producing first pulses in response to said source signal wherein the pulses corresponding to information signals are wider than a preselected width and the pulses corresponding to noise signals have a width smaller than said preselected width, and second pulse-producing means connected to said first pulse-producing means for producing second pulses in response to first pulses having a width greater than said preselected width, said first pulse-producing means comprising a differentiator circuit for producing a network signal which varies about a reference level wherein the portions of said network signal at said reference level correspond to portions of zero slope of the source signal, and a monostable amplifier connected to said differentiator circuit and being operable to initiate a first pulse in response to a change of said differentiator circuit signal from said reference level and to terminate the first pulse when said network signal returns to said reference level, said second pulse-producing means comprising an integrator circuit for producing signals representing the integration of said first pulses whereby said first pulses having a width less than said preselected width produce an integrated signal which has an amplitude below a predetermined level, and wave-shaping means connected to said integrator circuit for initiating a second pulse in response to an integrator circuit signal above said predetermined level and for terminating the second pulse when the integrator circuit signal reaches another level.

* * * * *